United States Patent [19]

Massa

[11] 4,128,370
[45] Dec. 5, 1978

[54] MANUFACTURE OF ELECTROACOUSTIC TRANSDUCERS WHICH REQUIRE MOLDING AN ELASTOMER TO THE SURFACE OF THE TRANSDUCER MATERIAL

[75] Inventor: Frank Massa, Cohasset, Mass.

[73] Assignee: Fred M. Dellorfano, Jr. and Donald P. Massa, Trustees, The Stoneleigh Trust, Cohasset, Mass.

[21] Appl. No.: 796,350

[22] Filed: May 12, 1977

[51] Int. Cl.² .............................................. B29C 6/00
[52] U.S. Cl. .................................. 425/128; 425/125; 425/127
[58] Field of Search ............... 425/117, 127, 128, 125, 425/129

[56] References Cited

U.S. PATENT DOCUMENTS

| 2,377,128 | 5/1945 | Burgess | 425/128 |
| 2,389,178 | 11/1945 | Blount et al. | 18/36 X |
| 2,440,144 | 4/1948 | Hosking | 425/128 |
| 2,798,255 | 7/1957 | Winters | 18/36 X |
| 2,823,419 | 2/1958 | Winters et al. | 425/127 X |
| 2,963,738 | 12/1960 | Brandes et al. | 425/127 |
| 3,709,457 | 1/1973 | Church | 425/125 X |

Primary Examiner—J. Howard Flint, Jr.

[57] ABSTRACT

This invention discloses a mold design which limits the maximum pressure that can be developed inside a closed cavity containing a polarized ceramic as a result of the volume expansion of the molding compound during the curing cycle. The pressure control is achieved by interposing a spring member between the mold and the pressure source which closes the mold. The spring will deflect slightly to absorb any volume expansion of the molding compound during the curing cycle, thus preventing any significant increase in pressure in the cavity and thereby preventing depolarization of the ceramic.

3 Claims, 6 Drawing Figures

MANUFACTURE OF ELECTROACOUSTIC TRANSDUCERS WHICH REQUIRE MOLDING AN ELASTOMER TO THE SURFACE OF THE TRANSDUCER MATERIAL

This invention is concerned with improvements in the molding of elastomers or plastic compounds to transducer elements such as piezoelectric ceramics, for example, which are subject to depolarization or loss in sensitivity under conditions of increased pressure. My invention is primarily concerned with the preservation of the normal properties of the transducer element after it is subjected to the molding operation.

It is well known that piezoelectric materials such as polarized lead-zirconate-titanate, for example, are subject to loss in polarization and a corresponding loss in sensitivity if subjected to pressures which exceed specific limits. The permissible pressure limits depend on the specific type of ceramic composition and are generally lower as the molding temperature is increased.

The primary object of this invention is to design a closed cavity mold for molding a compound to the surface of a transducer material such as a piezoelectric ceramic which is contained in the closed cavity and to prevent any deterioration in the performance characteristics of the transducer material as would result from increased pressure developed in the closed cavity due to thermal expansion of the confined molding compound during the curing process.

Another object of the invention is to design a mold for molding an elastomer to the surface of a piezoelectric element which insures that the maximum pressure applied to the element does not exceed a specified value.

A still further object of the invention is to precisely control the thickness of a layer of sound conducting compound molded to the surface of a piezoelectric disc which is recessed into an opening at one end of a rigid housing independently of any variation in the axial length of the housing into which the disc is recessed.

Another object of this invention is to design a mold for simultaneously molding a rubber layer of extremely precise thickness to the surfaces of a plurality of piezoelectric discs which are recessed and precisely located below the open end surfaces of a plurality of tubular housings and to maintain precise uniformity in the thickness of the molded rubber independent of the variations among the length dimensions of the plurality of the tubular housings.

This invention contemplates other object features and advantages that will become more fully apparent from the following detailed description taken in conjunction with the accompanying drawings which illustrate a preferred embodiment in which.

Figure 1:
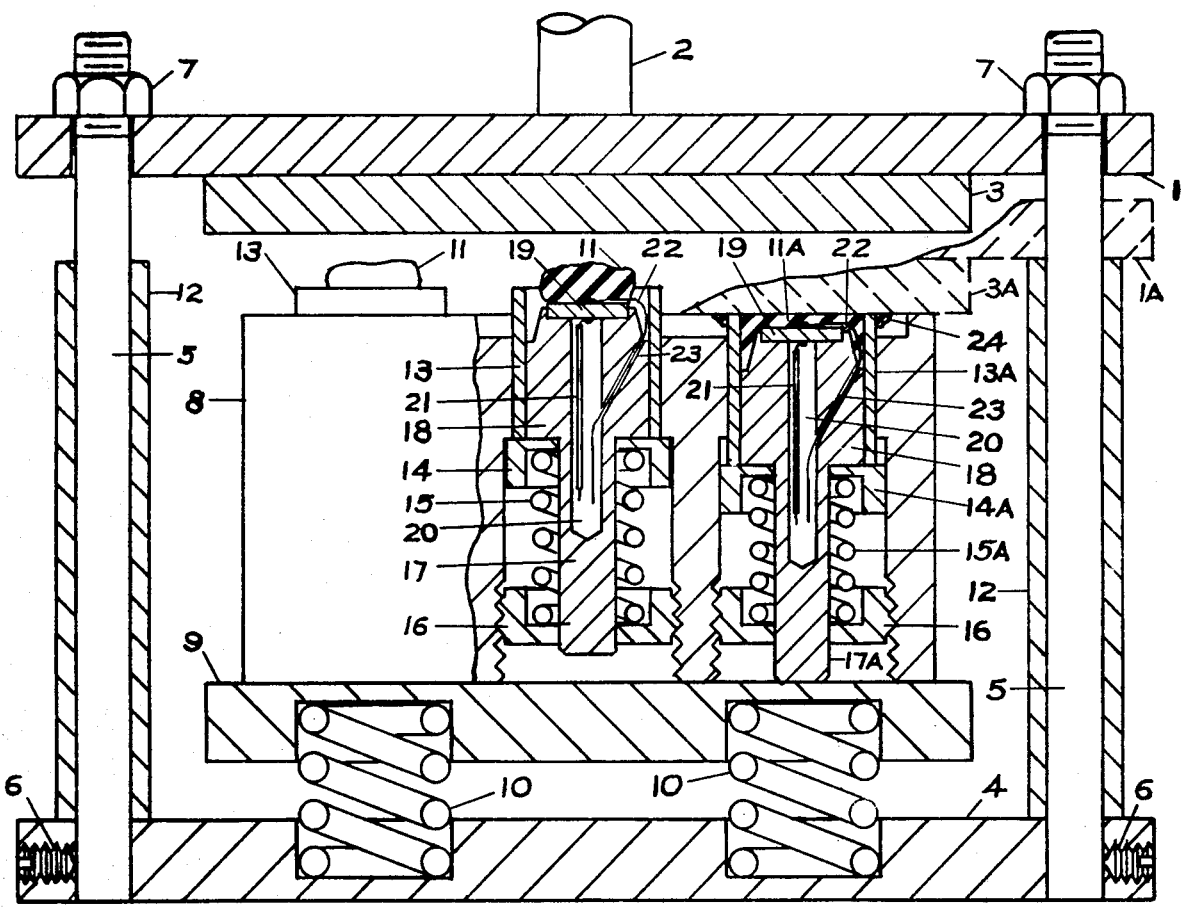
FIG. 1 shows a schematic view of a molding press and a partial cutaway cross-sectional view of a mold construction illustrating one preferred embodiment of my invention.
Figure 2:
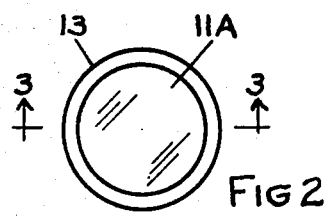
FIG. 2 shows a top view of an electroacoustic transducer assembly as produced from the inventive molding procedure illustrated in FIG. 1.
Figure 5:
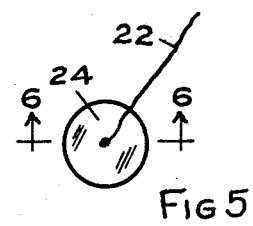
FIG. 5 is a plan view of a piezoelectric ceramic disc with attached electrical conductors as inserted in the mold illustrated in FIG. 1 to produce the molded transducer assembly illustrated in FIGS. 2, 3, and 4.
Figure 3:
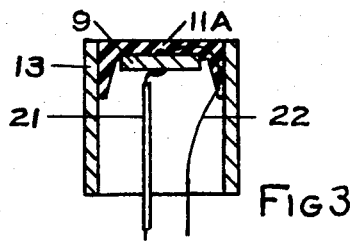
FIG. 3 is a cross-sectional view taken along the line 3 — 3 of FIG. 2.

Referring more particularly to the figures, the reference character 1 represents the top movable plate member of a conventional press which is operable from an air or hydraulic cylinder (not shown) through the rod 2. A conventional thermostatically heated platen 3 preferably having a smooth plane exposed surface is supported by the plate member 1 and provides the upper movable plate portion of the mold in the conventional manner. A fixed rigid base member 4 which is part of a conventional press structure is provided with guide rods 5 which are fixed to the base member 4 with the set screws 6. The guide rods 5 pass through clearance holes in the movable top plate member 1 to complete the main press structural assembly, as is well known in the art. Retaining nuts 7 are shown attached to the free ends of the guide rods 5 in the conventional manner to serve as limit stops for the vertical opening of the press at the OPEN stroke position of the rod 2.

In the conventional use of the molding press just described, a mold would be placed directly on the rigid base member 4 and after the molding compound is placed into the mold cavities, the movable top plate 1 would be lowered until the heated platen 3 which serves as the heated upper plate portion of the mold is closed tightly against the lower base portion of the mold 8 where it would be tightly held under pressure to force the heated molding compound throughout the cavities in the mold. The press would then be held closed for a specified time until the compound was cured, after which the press would be opened by raising the movable upper heated plate portion of the mold 3 and the molded parts would then be removed from the mold in the conventional manner.

Applicant found that in using the conventional molding procedure just described for the purpose of molding a layer of rubber or plastic material to the surface of a piezoelectric element, such as a ceramic disc, to produce an electroacoustic transducer assembly, the sensitivies of the molded transducer assemblies varied erratically. Applicant also found that the sensitivity variation was caused by the excessive pressures that could be produced inside the mold cavities when the mold was held closed as a result of the thermal expansion of the confined molding compound within the mold cavities during the hot curing cycle. To limit the maximum magnitude of the pressure increase that can develop within the closed cavity containing the molding compound during the curing cycle, Applicant has modified the conventional molding press and molding process, as will be described in this Specification. In addition to controlling the maximum magnitude of the pressure build-up that can take place in the closed cavity during the curing cycle of the molding operation, Applicant's inventive mold construction also achieves the very precise control of the thickness of the molded compound over the surface of the piezoelectric ceramic disc independent of the dimensional tolerance variations in the length of the tubular housings into which the ceramic discs are located during the molding operation.

Referring back to FIG. 1, the reference character 8 is a partial cutaway cross-sectional view of the lower base portion of Applicant's improved mold construction illustrating the novel features of one preferred embodiment of Applicant's invention. The partial cross-sectional view of the lower base portion of the mold 8 illustrates the structural features of Applicant's invention in which the cross-sectional view located along the center line of FIG. 1 shows the various elements in the inventive molding system including the molding compound 11 as placed in the OPEN position of the mold awaiting the lowering of the upper heated plate portion of the mold 3. The righthand cross-sectional view illustrates the position of the various elements in the molding system after the platen 3 is lowered to the dotted position 3A and the mold is in the CLOSED position. Following is a more detailed description of the inventive molding system which achieves the objects of this invention.

The lower base portion of the mold 8 is supported on an intermediate plate member 9 which is, in turn, flexibly supported from the rigid base member 4 by the helical springs 10, which are preferably held in place within the recessed holes provided in the surfaces of the intermediate plate member 9 and rigid base member 4 to which the springs are attached, as illustrated in FIG. 1. To limit the magnitude of the maximum pressure which can be developed within the closed cavities which are filled with molding compound during the curing cycle, sleeve members 12 are placed over the guide pins 5 to act as a stop for the top plate 1 when it is lowered to the CLOSED molding position 1A. The height of the sleeve members 12 is determined by the maximum limit of pressure which must not be exceeded within the mold cavities during the curing of the molding compound. The procedure for establishing the height dimension of the sleeve 12 is as follows:

First, a determination is made to establish the maximum permissible pressure that can be permitted to develop within the closed mold cavities without causing any change in the characteristics of the piezoelectric element. For some of the lead-zirconate-titanate ceramics, the maximum pressure limit is approximately 1000 psi. The permissible maximum pressure when multiplied by the total area of all the piezoelectric elements placed within the closed cavities establishes the maximum total force that may not be exceeded in holding the mold closed. If the heated upper plate portion 3 and lower base portion 8 of the mold were closed in the conventional manner with the lower based portion of the mold 8 resting on the rigid base member 4, the volume expansion of the confined molding compound within the cavities during the hot curing cycle would cause an uncontrollable build-up in pressure which could deteriorate the performance characteristics of the piezoelectric elements located inside the cavities. In the inventive system, the lower based portion of the mold 8 is supported by the spring members 10 which are selected to develop a specified force which does not exceed the magnitude which safely limits the maximum pressure which may be permitted inside the cavities when the mold is closed. The height of the sleeves 12 are so chosen that when the mold is closed and the top movable plate member 1 is in position 1A contacting the sleeve members 12, the height of the sleeve is such that the spring members 10 are deflected by the required amount to establish the maximum force against which the closed mold is subjected, thus limiting the maximum pressure build-up in the mold cavities to the safe maximum specified value necessary to prevent depolarization of the ceramic elements. Under such conditions, any volume expansion of the molding compound within the closed cavity during the hot curing cycle will be taken up by an imperceptible increase in the deflection of the springs 10 without any significant change in the molding pressure within the cavity, thus achieving the primary object of this invention. In the prior art conventional molding procedure in which the mold is closed between fixed rigid plate members, the thermal expansion of the molding compound in the closed cavities during the curing cycle develops excessive pressures inside the cavities, resulting in damage to the electroacoustic characteristics of the piezoelectric element. This difficulty is eliminated in Applicant's improved molding system, as disclosed in this invention.

Figure 6:
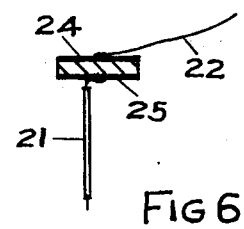
FIG. 6 is a cross-sectional view taken along the line 6 — 6 of FIG. 5.
Figure 4:
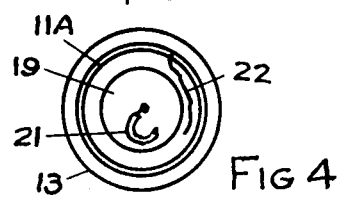
FIG. 4 is a bottom view of the structure illustrated in FIG. 2.

Applicant's inventive mold design also achieves an additional object of this invention which is to obtain the very precise control of the thickness of a layer of molding compound which is molded to the surface of a polarized ceramic disc which is located within the open end of a cylindrical housing. The thickness of the material is precisely controlled independently of the tolerance variation in the length of the housing. An illustrative embodiment of the inventive mold design to accomplish this objective is illustrated in the two cross-sectional views of the mold construction shown in FIG. 1. The cross-sectional view on the center line of the drawing illustrates the mold in the open position in which a cylindrical housing 13 is located into a clearance hole in the lower base portion of the mold member 8 and rests on the top surface of a slidable platform member 14. The platform member 14 is held against the shoulder formed by the counterbored hole in the lower base portion of the mold section, as illustrated. A compressed spring 15 is held in position by the nut member 16 to keep the platform member 14 in its uppermost position against the counterbored shoulder. A cylindrical mold insert support member 18 has an axial extension shaft portion 17 which slides through a clearance hole in the nut member 16. The body diameter of the member 18 is a slidable fit to the inside diameter of the housing 13. The upper end of the member 18 has a recessed surface for accurately locating the ceramic disc 19. A hole 20 is drilled along the center line of the member 18 to contain the electrical conductor 21 during molding, as illustrated. The conductor 21 is connected to the ceramic electrode surface 25, as illustrated in FIG. 6. The conductor 22 which is connected to the upper ceramic electrode surface 24, is inserted through the small clearance hole 23, as illusrrated in FIG. 1 so that both conductors will remain protected within the hole 20 during the molding operation.

In preparation for the molding operation, a volume of uncured molding compound 11 is placed on top of the ceramic element, as illustrated, and the top movable plate member 1 is lowered to the position 1A to bring the upper heated plate portion of the mold 3 to the CLOSED position 3A. At the closed position of the mold, the top of the housing 13A is held against the surface of the upper heated plate portion of the mold 3A by the force developed in the compressed spring 15A. In the closed position of the mold, the bottom of the shaft portion 17A is held against the surface of the intermediate plate member 9, as illustrated. The difference between the height of the lower base portion of the mold 8 and length of the mold insert support member 18 is selected to precisely determine the desired thickness of the molded compound 11A. The surplus molding compound is forced over the top of the housing 13 when the mold is closed and appears as flash 24 around the outer periphery of the housing, as shown. The volume expansion of the compound 11A during the hot curing cycle is taken up by the spring members 10, and thereby prevents the uncontrolled increase in pressure that would otherwise occur within the cavity containing the ceramic element, as would be the case in the absence of the inventive use of the compliant support for the mold 8, as described.

In the closed mold position, the housing 13A is supported by the displaced platform member 14A and the upper end of the housing 13A is held against the surface of the upper heated plate portion of the mold 3A by the compressed spring 15A, as illustrated in the drawing. By the use of the slidable platform member 14A as the housing support, any variation in the length of the housing 13A will be taken up by the deflection of the spring member 15A and thereby maintain precise control of the thickness of the molded compound 11A regardless of the variation in the length of the housing member 13A. The described procedure for precisely controlling the tolerance of the thickness variation in the molded compound 11A is particularly advantageous in the manufacture of transducers of the type described in U.S. Pat. No. 3,928,777 when designed to operate in the ultrasonic frequency region in which the thickness of the quarter wavelength transmission line, as described in the patent, is a fraction of an inch and in which it is desired to precisely control the thickness of the molded material to within a few degrees of the wavelength of sound in the molded material at the frequency of operation. For operation at the higher ultrasonic frequencies in the region above approximately 50 kHz, it is sometimes required to control the thickness of the molded quarter wavelength acoustic transmission line to the order of one thousandth of an inch or less. Thus the elimination of the effect of the length tolerance of the housing in influencing the thickness of the molded compound by the inventive procedure described accomplishes one of the desired objectives of this invention. The achievement of precise control of the thickness of the molded compound by the mold construction just described is particularly useful in a multi-cavity mold where a plurality of housings with varying lengths are inserted in the multiple cavities.

While a specific embodiment of the present invention has been shown and described, it should be understood that various modifications and alternative constructions may be made without departing from the true spirit and scope of the invention. Therefore, the appended claims are intended to cover all such equivalent alternative constructions that fall within their true spirit and scope.

I claim:

1. In combination in a system for molding a layer of sound conducting material of precise dimensions to the surface of an electroacoustic transducer element whose electroacoustic characteristics are permanently changed if the element is subjected to a pressure in excess of a specified magnitude, a mold comprising a lower base portion and a heated upper plate portion, said lower base portion including a cavity portion with a mechanical insert support means for precisely locating a transducer element within said cavity, a press comprising a rigid base member and a movable plate member, compliant support means for floatingly supporting said mold between said rigid base member and said movable plate member, said compliant support means includes a spring member interposed between either of said press members and said mold, force means supplied by said press for moving said movable plate member towards said rigid base member to force said heated upper plate portion of said mold toward said lower base portion to close said mold, whereby a precisely dimensioned closed cavity results within said mold, said force supplied by said press for closing said mold is applied to said mold through said spring member, means for limiting the maximum displacement of said spring member upon closing said mold whereby said maximum spring displacement fixes the maximum magnitude of force which is being applied through said spring member to hold said mold closed during the molding operation.

2. The invention in claim 1 characterized in that said mechanical insert support means includes guide means for positioning a tubular housing member in a prescribed location relative to said mechanical insert support means, said mold further characterized in that a spring supported slidable platform member is located in said base portion of said mold to provide a movable support for said mechanical insert support means, said spring supported slidable platform member characterized in that it forces said mechanical insert support means toward said upper movable plate portion of said mold when the mold is closed.

3. The invention in claim 1 further characterized in that a plurality of cavity portions and a plurality of mechanical insert support means are provided in said mold, and still further characterized in that a plurality of spring-supported slidable platform members are located in said base portion of said mold to provide separate movable supports for each of said plurality of mechanical insert support means whereby each spring-supported slidable platform member separately forces one of said plurality of mechanical insert support means toward said upper movable plate portion of said mold when said mold is closed.

* * * * *